Patented Nov. 28, 1933

1,937,154

UNITED STATES PATENT OFFICE 1,937,154

HALOGENATED PYRIDINOANTHRAQUINONES

Max Albert Kunz, Mannheim, and Karl Koeberle and Gerd Kochendoerfer, Ludwigshafen-on-the-Rhine, Germany, assignors to General Aniline Works, Inc., New York, N. Y., a corporation of Delaware No Drawing. Application January 22, 1932, Serial No. 588,232, and in Germany January 28, 1931

9 Claims. (Cl. 260—40)

The present invention relates to new compounds which are halogenated pyridinoanthraquinones, and process of producing same.

We have found that halogenated pyridinoanthraquinones are obtained by treating pyridinoanthraquinone or its substitution products with chlorine, bromine or iodine or agents supplying these halogens in the absence of any diluent or in the presence of an inert organic or inorganic diluent, if desired in the presence of halogen transferrers. Suitable organic diluents in which halogenation may be carried out, are in particular aromatic diluents of high boiling point, such as nitro and halogen substitution products of benzene and its homologues, naphthalene and its substitution products and the like. Inorganic diluents which may be employed are, for example, water to which alkalies may be added, and in particular sulphuric acids, such as sulphuric acid itself in a concentrated and diluted state, oleum and chlorosulphonic acid. As halogenating catalysts those usually employed in halogenations may be used.

The new halogen substitution products of pyridinoanthraquinones may also be produced by replacing an amino group or amino groups in amino-pyridinoanthraquinones by halogen by way of the diazo compound. The diazotization may be carried out by the usual methods by means of a nitrate in sulphonic acid or nitrosylsulphuric acid. Also the replacement of the diazo group or groups by halogen can be carried out by conventional methods, for example by treating the diazo compounds with cuprous halides or alkali metal iodides.

A further method of producing the new halogen derivatives of pyridinoanthraquinones which is particularly advantageous in view of the uniform products obtained thereby consists in treating halogenated aminoanthraquinones, in which at least one ortho position to an amino group is unoccupied, with glycerine or its substitution products, as for example chlorhydrins, or its equivalents, such as their anhydrides, esters and ethers, in the presence of an oxidizing agent in acid, preferably sulphuric acid, solution at temperatures above 100° C., but generally speaking, below 170° C. The most suitable temperatures are between about 105° and 120° C. Especially uniform products are obtained by this method when starting from halogenated aminoanthraquinones in which one ortho position to the amino group is free and the other occupied as is the case with halogenated 1-aminoanthraquinones having a free 2-position and 2-aminoanthraquinones having a free 1-position or 3-position and substituted in the 3-position or 1-position respectively by halogen, or any other substituent and containing halogen in addition thereto. The oxidizing agent is to be added in at least an equivalent amount, i. e. an amount sufficient to yield one atomic proportion of oxygen for each pyridino ring to be formed. When calculating the necessary amount of oxidizing agent, it is to be kept in mind that the mixture of glycerine and sulphuric acid can react as a reducing agent, in particular at higher temperatures, for example at temperatures above about 130° C., due to some decomposition of glycerine occurring and, therefore, it is necessary to make good for such reducing action by the addition of a surplus of oxidizing agent.

Instead of halogenated aminoanthraquinones themselves, their N-substitution products, for example their acyl compounds, or compounds which are capable of reacting as aminoanthraquinones, for example the corresponding azomethines, may also be employed as starting materials for the synthetic method of producing halogenated pyridinoanthraquinones by means of a glycerine in sulphuric acid in the presence of an oxidizing agent. Suitable oxidizing agents are, for example, organic nitro compounds, such as picryl chloride, nitrobenzene and its sulphonic acids, arsenic acid and ferric salts. Halogenated pyridinoanthraquinones prepared by the said synthetic method or by way of the diazo compounds may also further be halogenated by direct halogenation in the above described manner.

Substituents present in the initial materials do not interfere with the aforedescribed methods of producing halogenated pyridinoanthraquinones. Thus cyano, carboxylic, mercapto, hydroxy, alkoxy, nitro, amino, substituted amino, sulpho and pyridino groups may be present in the initial materials.

The halogenated pyridinoanthraquinones and their substitution products are, generally speaking, practically colorless or slightly yellow substances which dissolve comparatively readily in concentrated sulphuric acid giving usually yellow to orange red colorations, while their vat solutions are usually orange to blue in color. The reaction products may be purified, either simultaneously with their preparation or subsequently thereto, by the usual methods, as for example crystallization or boiling with organic solvents, or by way of their salts with strong acids, or by sublimation, vatting or treatment with oxidizing agents.

The pyridinoanthraquinones containing chlorine, bromine, iodine or two or more of these halogens may be employed as intermediate products for the preparation of dyestuffs or other substances.

The following examples will further illustrate the nature of this invention but the invention is not restricted to these examples. The parts are by weight.

Example 1

50 parts of 2(N)-1-pyridinoanthraquinone are heated to boiling for several hours in 500 parts of trichlorbenzene after the addition of 5 parts of iodine and while leading in chlorine gas. The reaction proceeds according to the following equation:

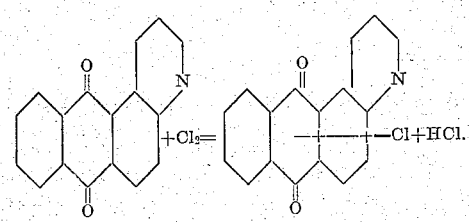

After cooling, the reaction product which separates in the form of yellow needles is filtered off by suction. According to analysis the product is a monochlor derivative; it dissolves in concentrated sulphuric acid giving an orange coloration and its vat solution is violet.

Starting with 3-cyan-2(N)-1-pyridinoanthraquinone (obtainable from 3-brom-2(N)-1-pyridinoanthraquinone (see Example 4) by heating with cuprous cyanide in pyridine) a reaction product containing chlorine which gives a violet blue vat is obtained in a similar manner; in the same way 2(N)-1-pyridinoanthraquinone-3-carboxylic acid (obtainable from the said cyano derivative by saponification) or 3-mercapto-2(N)-1-pyridinoanthraquinone (obtainable from 3-brom-2(N)-1-pyridinoanthraquinone by boiling with sodium sulphide) is converted into a reaction product containing chlorine by the said treatment. (Starting with 3-methyl-2(N)-1-pyridinoanthraquinone a chloro-3-methyl-2(N)-1-pyridinoanthraquinone is obtained in the aforedescribed manner. By the same method also the corresponding phenyl derivatives of halogenated pyridinoanthraquinones are obtained.

Example 2

30 parts of 1-chlor-2-aminoanthraquinone are dissolved in 400 parts of concentrated sulphuric and then 25 parts of sodium nitrobenzene sulphonate, 30 parts of 85 per cent glycerine and 42 parts of water are added. The reaction mixture is heated for from about 1 to 2 hours at from 105° to 115° C. and, when the conversion is completed, 30 parts of water are allowed to flow in. The reaction proceeds according to the equation:

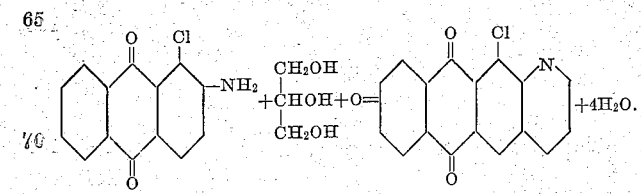

After cooling, the sulphate of the reaction product which has separated in a crystalline form is filtered off by suction and decomposed in the usual manner. The 1-chlor-2(N)-3-pyridinoanthraquinone thus obtained is a grey powder which may be obtained in a crystalline form from solvents of high boiling point.

In an analogous manner 1.4-dichloro-2(N)-3-pyridinoanthraquinone is obtained from 1.4-dichloro-2-aminoanthraquinone.

Example 3

100 parts of 1(N)-2-pyridinoanthraquinone are suspended in 500 parts of nitrobenzene while stirring. After adding 0.5 part of iodine and 150 parts of sulphuryl chloride, the mixture is heated at 90° to 100° C. for several hours and then allowed to cool. The chlor-1(N)-2-pyridinoanthraquinone which separates out is filtered off by suction. It is a yellow powder, dissolves in concentrated sulphuric acid giving a yellow coloration and yields an orange vat.

Example 4

25 parts of 2-amino-3-bromanthraquinone are dissolved in 300 parts of concentrated sulphuric acid and then 17 parts of nitrobenzene sulphonic acid, 20 parts of 90 per cent glycerine and 30 parts of water are introduced. The mixture is heated to from 105° to 115° C. for about 1½ hours and then 200 parts of water are stirred in. The sulphate of the reaction product which separates out in a crystalline form is filtered off by suction and the 3-brom-2(N)-1-pyridinoanthraquinone is recovered therefrom in the usual manner as a yellow powder. It may be crystallized from organic solvents. The color of its solutions in sulphuric acid is yellow while its vat is red having a violet shade.

Example 5

50 parts of 2(N)-3-pyridinoanthraquinone (prepared from 1-chlor-2(N)-3-pyridinoanthraquinone as obtained in Example 2 by dehalogenation) are dissolved while stirring in 500 parts of chlorsulphonic acid. After adding 0.5 part of iodine and 50 parts of bromine, the mixture is heated slowly to from 65° to 70° C., kept at this temperature until all of the bromine has been consumed, allowed to cool, diluted with a little sulphuric acid, poured into ice-water, boiled for a short time and the reaction product filtered off by suction and dried. The brom-2(N)-3-pyridinoanthraquinone thus obtained is a straw-yellow powder, crystallizes in the form of yellow needles, dissolves in concentrated sulphuric acid giving a green yellow coloration and yields a yellow green vat.

When starting from nitro-2(N)-1-pyridinoanthraquinone (obtainable by nitrating 2(N)-1-pyridinoanthraquinone in sulphuric acid with nitric acid) bromo-nitro-2(N)-1-pyridinoanthraquinone is obtained in the aforedescribed manner. It is a yellow powder yielding a violet vat in an alkaline hydrosulphite solution.

A reaction product containing chlorine and iodine is obtained in an analogous manner by heating 12 parts of 1-chlor-2(N)-3-pyridino-anthraquinone in 100 parts of monohydrate and 20 parts of oleum with 5 parts of iodine at from 140° to 150° C.

Example 6

50 parts of 8-chlor-1-aminoanthraquinone are dissolved in 700 parts of concentrated sulphuric acid, 45 parts of 90 per cent glycerine and 70 parts of water are introduced. The mixture is heated for from about 1½ to 2 hours at from 110° to 120° C., poured into a large amount of water, filtered by suction from small amounts of impurities which have separated and the filtrate rendered alkaline. A yellow brown precipitate separates which is filtered off by suction, washed until neutral and dried. The 8-chlor-1(N)-2-pyridinoanthraquinone thus obtained may be further purified by crystallization. It is readily soluble even in dilute acids; the color of its solutions in sulphuric acid is yellow red. In the same way 5-chlor-1(N)-2-pyridinoanthraquinone may be obtained from 5-chlor-1-aminoanthraquinone, or 4-chlor-1(N)-2-pyridinoanthraquinone from 4-chlor-1-aminoanthraquinone.

In an analogous manner the corresponding bromo derivatives of 1(N)-2-pyridinoanthraquinone are obtained.

Example 7

10 parts of 3-hydroxy-2(N)-1-pyridinoanthraquinone (obtainable from 3-hydroxy-2-aminoanthraquinone by condensation with glycerine in sulphuric acid in the presence of oxidizing agents) are dissolved in about 200 parts of 2 per cent caustic soda solution. 60 parts of bromine are then added and the whole heated for several hours at from 95° to 100° C., allowed to cool and the reaction product obtained in excellent yields filtered off by suction. It is a yellow powder which dissolves in concentrated sulphuric acid giving a golden yellow coloration, in caustic soda solution giving a violet coloration and in alkaline hydrosulphite to give a red brown vat.

By heating 8-chlor-1(N)-2-pyridinoanthraquinone with 3 parts of bromine without employing a diluent but in the presence of 0.05 part of iodine at from 70° to 80° C., a brown red bromochloro derivative is obtained which is converted by treatment with sodium bisulphite solution into a sulphonic acid which dyes wool yellow red shades from acid baths.

Example 8

14 parts of mono-amino-2(N)-1-pyridinoanthraquinone (obtainable by nitrating 2(N)-1-pyridinoanthraquinone in solution in sulphuric acid and reducing the nitro derivative formed) are dissolved in 90 parts of concentrated sulphuric acid and then the calculated amount of nitrosyl sulphuric acid is added at from 10° to 20° C. After a short time the whole is poured onto ice and the clear yellow brown solution is stirred into an aqueous solution of potassium iodide. While the solution froths strongly, a red brown mass separates which, after warming the reaction mixture for a short time, is filtered off by suction and dried. The monoiodo-2(N)-1-pyridinoanthraquinone thus obtained may be crystallized for example from trichlorbenzene. The reaction proceeds according to the following formulæ:

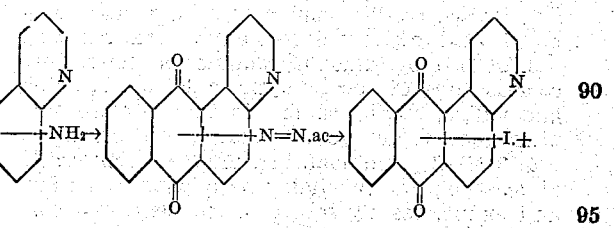

Example 9

100 parts of 1-chlor-2(N)-3-pyridinoanthraquinone (prepared as described in Example 2) are dissolved in 1000 parts of chlorsulphonic acid while stirring. After adding 10 parts of sulphur, 0.5 part of mercury and 100 parts of bromine the whole is heated at 80° C. until all the bromine has been consumed. The whole is then allowed to cool and is worked up in the usual manner. The resulting brom-1-chlor-2(N)-3-pyridinoanthraquinone, a yellowish powder, crystallizes in the form of pale yellow needles, dissolves in concentrated sulphuric acid giving a yellow green coloration and yields a yellow green vat.

A tribrom-2(N)-1-pyridinoanthraquinone is obtained in a similar manner from 3-brom-2(N)-1-pyridinoanthraquinone.

Example 10

10 parts of the dipyridinoanthraquinone obtained from 2.6-diaminoanthraquinone by treating with glycerine ad sulphuric acid in the presence of nitrobenzene sulphonic acid are heated for several hours while stirring at from 60° to 65° C. in 500 parts of oleum containing 11.5 per cent of free SO₃ after the addition of 50 parts of bromine. After cooling the reaction mixture is worked up in the usual manner. The resulting bromdipyridinoanthraquinone is a yellow powder which may be crystallized from organic solvents or from sulphuric acid; it dissolves in the latter giving a golden yellow coloration and its vat solutions are violet.

An orange colored derivative is obtained by chlorinating in concentrated sulphuric acid solution 4-methoxy-1(N)-2-pyridinoanthraquinone (obtainable by treating 1-amino-4-methoxyanthraquinone with glycerine and sulphuric acid in the presence of nitrobenzene sulphonic acid).

Example 11

10 parts of 2-amino-3-bromanthraquinone are dissolved in 200 parts of concentrated sulphuric acid, 30 parts of water and 20 parts of sodium nitrobenzene sulphonate are introduced and then 10 parts of monoacetin are stirred in. The whole is then heated for from 1 to 2 hours at from 110° to 115° C. and poured into water. The precipitate is filtered off by suction and dried. The reaction product is crystallized from trichlorbenzene; it is a yellow crystal powder and is identical with the 2(N)-1-pyridino-3-bromanthraquinone obtainable according to Example 4.

Other esters of glycerine and likewise epichlorhydrin may be employed instead of monoacetin.

What we claim is:

1. Pyridinoanthraquinones containing at least one of the halogens chlorine, bromine and iodine, readily soluble in concentrated sulphuric acid to give yellow to orange red solutions.

2. 1(N)-2-pyridinoanthraquinones containing at least one of the halogens chlorine, bromine and iodine, readily soluble in concentrated sulphuric acid to give yellow to orange red solutions.

3. 2(N)-1-pyridinoanthraquinones containing at least one of the halogens chlorine, bromine and iodine, readily soluble in concentrated sulphuric acid to give yellow to orange red solutions.

4. 2(N)-3-pyridinoanthraquinones containing at least one of the halogens chlorine, bromine and iodine, readily soluble in concentrated sulphuric acid to give yellow to orange red solutions.

5. 1(N)-2-pyridinoanthraquinones containing at least one of the halogens chlorine, bromine and iodine, forming yellow powders, dissolving in concentrated sulphuric acid to give yellow solutions and yielding orange solutions in an alkaline hydrosulphite solution.

6. 1(N)-2-pyridinoanthraquinones containing at least one of the halogens chlorine, bromine and iodine in an alpha position, forming yellow powders, dissolving in concentrated sulphuric acid to give yellow solutions and yielding orange solutions in an alkaline hydrosulphite solution.

7. 1(N)-2-pyridinoanthraquinones containing chlorine, forming yellow powders, dissolving in concentrated sulphuric acid to give yellow solutions and yielding orange solutions in an alkaline hydrosulphite solution.

8. 2(N)-1-pyridinoanthraquinones containing at least one of the halogens chlorine, bromine and iodine, forming yellow powders, dissolving in concentrated sulphuric acid to give yellow solutions and yielding violet to blue solutions in an alkaline hydrosulphite solution.

9. 2(N)-1-pyridinoanthraquinone of the formula:

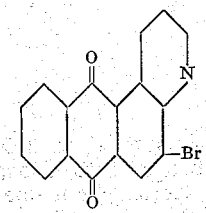

forming a yellow powder, dissolving in concentrated sulphuric acid to give a yellow solution and yielding a violet solution in an alkaline hydrosulphite solution.

MAX ALBERT KUNZ.
KARL KOEBERLE.
GERD KOCHENDOERFER.